United States Patent
Rozman et al.

(10) Patent No.: US 8,866,449 B1
(45) Date of Patent: Oct. 21, 2014

(54) SENSOR PM ELECTRICAL MACHINES

(71) Applicant: Hamilton Sunstrand Corporation, Charlotte, NC (US)

(72) Inventors: Gregory I. Rozman, Rockford, IL (US); Jacek F. Gieras, Glastonbury, CT (US); Steven J. Moss, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 13/914,341

(22) Filed: Jun. 10, 2013

(51) Int. Cl.
*H02P 9/14* (2006.01)

(52) U.S. Cl.
USPC .............................. 322/46; 322/59

(58) Field of Classification Search
USPC ......................... 322/37, 46, 59, 99
See application file for complete search history.

(56) References Cited

U.S. PATENT DOCUMENTS

| | | | |
|---|---|---|---|
| 5,329,195 A | | 7/1994 | Horber et al. |
| 5,493,201 A | * | 2/1996 | Baker .............................. 322/10 |
| 5,512,813 A | * | 4/1996 | Uchinami ........................ 322/28 |
| 5,594,322 A | * | 1/1997 | Rozman et al. ................. 322/10 |
| 5,719,487 A | * | 2/1998 | Sato et al. ........................ 322/28 |
| 5,780,995 A | * | 7/1998 | Maggioni et al. ................. 322/8 |
| 6,111,390 A | * | 8/2000 | Inaba et al. ..................... 322/28 |
| 6,160,384 A | * | 12/2000 | Inaba et al. ..................... 322/59 |
| 6,188,204 B1 | * | 2/2001 | Vithayathil et al. ............ 322/29 |
| 7,072,790 B2 | | 7/2006 | Hu et al. |
| 8,027,180 B2 | * | 9/2011 | Nakagawa ...................... 363/98 |

OTHER PUBLICATIONS

M. Tursini et al., "Initial Rotor Position Estimation Method for PM Motors", IEEE Transactions on Industr Applications, vol. 39, No. 6, Nov./Dec. 2003, pp. 1630-1640.

* cited by examiner

*Primary Examiner* — Nicholas Ponomarenko
(74) *Attorney, Agent, or Firm* — Edwards Wildman Palmer LLP; Scott D. Wofsy; Joshua L. Jones (57) ABSTRACT

A new and useful electrical machine includes a stator including a stator winding and a primary transformer coil. A rotor is operatively connected to rotate relative to the stator, wherein the rotor includes a plurality of embedded permanent magnets. An excitation coil is wound on the rotor and is operatively connected to form a rotating transformer with the primary transformer coil. An inverter/active rectifier component is operatively connected to the stator winding and the primary transformer coil to control the stator winding based on excitation in the stator winding from the excitation coil and permanent magnets.

20 Claims, 6 Drawing Sheets

SENSOR PM ELECTRICAL MACHINES

BACKGROUND OF THE INVENTION

1. Field of the Invention

The present invention relates to electrical machines such as motors and generators, and more particularly to angular position and velocity estimation of permanent magnet (PM) synchronous machines.

2. Description of Related Art

PM machines can be classified based on the flux distribution or back-electromagnetic force (EMF) waveform as square-wave brushless dc machines (BLDCM) and sinewave or synchronous machines (PMSM). The BLDCM utilizes a trapezoidal back-EMF waveform and supplied by rectangular current waveforms with conduction duration of 120°. The commutation is based on the rotor position with 60° resolution typically provided by Hall sensors. The PMSM utilizes sinusoidal back-EMF and supplied by sinusoidal current waveforms properly phased with respect to the back-EMF. The rotor position information is typically provided by resolvers or encoders.

Most of sensorless motor controllers utilize position estimation techniques for both BLDCM and PMSM using back-EMF. The initial rotor position information at standstill is not available using back-EMF methods. The possible initial starting methods can be classified based on the following:

Starting from predetermined rotor position established by proper feeding;

Open-loop start up; and

Estimation of the rotor position at zero speed based on state observers utilizing machine parameters.

See, M. Tursini, R. Petrella, F. Parasiliti, "Initial Rotor Position Estimation Method for PM Motors", IEEE Transactions On Industy Applications, Vol. 39, No. 6, November/December 2003, pp. 1630-1640, which is incorporated by reference herein in its entirety.

The above techniques may not guarantee good accuracy in rotor position estimation at zero and low speed. A combination method utilizes a resolver at zero and low speed and a sensorless algorithm based on extended rotor flux at medium and high speed. See U.S. Pat. No. 7,072,790 to Hu et al., which is incorporated by reference herein in its entirety. The reason to use sensorless algorithms at medium and high speed is to reduce negative effect of non-ideal resolver characteristics such as an amplitude imbalance, imperfect quadrature, and inductive harmonics on the current controller and motoring torque.

U.S. Pat. No. 5,329,195 to Horber et al., which is incorporated by reference herein in its entirety, describes utilizing a PM motor with the stator pole elements wound with two coils. One coil on each pole element includes a sensor winding, and the other includes a power winding. As a result, all pole elements of the stator are utilized both to produce rotor drive torque and also to generate electrical signals that provide accurate rotor position information. This approach is useful for small size PM machines because of elimination of a somewhat similar sized resolver. However, for the larger size PM machines this approach considerably penalizes the power density of the machine, and, therefore, may not be attractive in applications such as aerospace or ground vehicles.

Such conventional methods and systems have generally been considered satisfactory for their intended purpose. However, there is still a need in the art for systems and methods that allow for improved performance such as reliability, complexity, and cost. There also remains a need in the art for such systems and methods that are easy to make and use. The present invention provides a solution for these problems.

SUMMARY OF THE INVENTION

A new and useful electrical machine includes a stator including a stator winding and a primary transformer coil. A rotor is operatively connected to rotate relative to the stator, wherein the rotor includes a plurality of embedded permanent magnets. An excitation coil is wound on the rotor and is operatively connected to form a rotating transformer with the primary transformer coil. An inverter/active rectifier component is operatively connected to the stator winding and the primary transformer coil to control the stator winding based on excitation in the stator winding from the excitation coil and permanent magnets.

The inverter/active rectifier component can be configured to direct external power through the stator to drive the rotor in a motoring mode and to deliver power from the stator to an external DC load in a generate mode. An AC power source can be operatively connected between the inverter/active rectifier component and the primary transformer coil to control power to the rotating transformer. An RC damper can be connected in parallel with the excitation coil.

In certain embodiments, the inverter/active rectifier component includes a position and velocity decoder configured and adapted to receive inverter voltage signals and to output position and velocity feedback. The inverter/active rectifier component also includes a proportional and integral regulator with a first switch for switching between a velocity reference input for the motoring mode and a DC voltage reference for a generate mode, and a second switch for switching between the velocity feedback and a DC voltage feedback input. The proportional and integral regulator is configured to output a torque reference signal in the motoring mode and a flux reference signal in the generate mode. A field oriented control is operatively connected to receive the reference signals from the proportional and integral regulator, the position feedback from the position and velocity decoder, and inverter current signals and to output stationary frame command signals.

It is contemplated that a quadrature generator can be operatively connected to an AC power source to inject quadrature (sine and cosine) into the excitation coil. The position and velocity decoder can include a Clark's Transformation component operatively connected to convert three phase inverter voltage signals into two phase voltage signals. A pair of synchronous filters can each be operatively connected to receive a respective one of the two phase voltage signals. Each synchronous filter can also be operatively connected to receive sine and cosine signals from a quadrature generator and to output VF_alpha and VF_beta signals phase-shifted by 90 electrical degrees that contain rotor position information.

In certain embodiments a second Clark's Transformation component is operatively connected to convert three phase inverter current signals into two phase current signals and an extended rotor flux estimator is operatively connected to receive the two phase current signals and the two phase voltage signals and to output Fext_alpha and Fext_beta signals phase-shifted by 90 electrical degrees that contain extended rotor flux information. A position velocity estimator can be included with a first switch for switching between Fext_alpha input in a high speed mode and VF_alpha input in a low speed mode and a second switch for switching between Fext_beta input in a high speed mode and VF_beta input in a low speed mode. The position velocity estimator is configured to output the position feedback and the velocity feedback. An estimated mode selector can be operatively connected to receive the velocity feedback and control the first and second switches of the position velocity estimator for selection between the high and low speed modes.

A method of controlling an electrical machine includes separating an excitation coil signal and a permanent magnet signal from a combined feedback signal from an electrical machine such as described above. The method also includes estimating position and velocity of the rotor based on the excitation coil signal and the permanent magnet signal and using estimated position and velocity of the rotor to control the electrical machine. Using estimated position and velocity of the rotor to control the electrical machine can include controlling rotor toque in a motoring mode and controlling rotor flux in a generate mode.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 1:
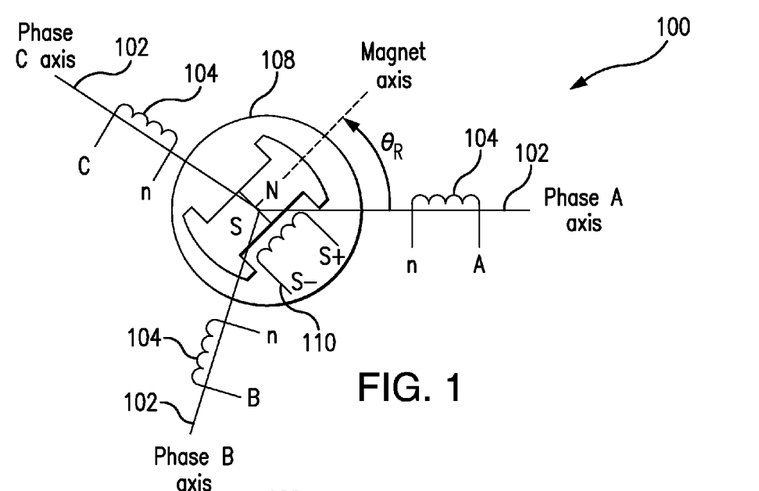
FIG. 1 is a schematic view of an exemplary embodiment of a sensor PM electrical machine, showing the excitation coil of the rotor.
Figure 2:
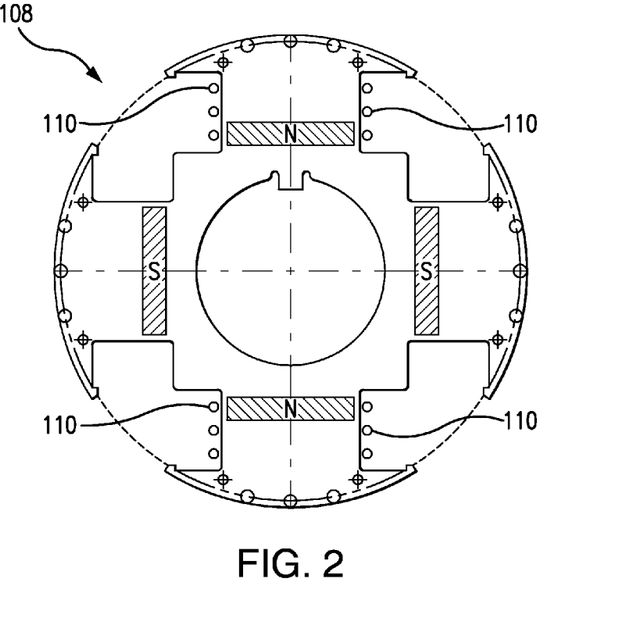
FIG. 2 is a schematic end elevation view of the rotor of FIG. 1, showing the excitation coils and embedded magnets.

Reference will now be made to the drawings wherein like reference numerals identify similar structural features or aspects of the subject invention. For purposes of explanation and illustration, and not limitation, a partial view of an exemplary embodiment of an electrical machine is shown in FIG. 1 and is designated generally by reference character 100. Other embodiments of electrical machines, or aspects thereof, are provided in FIGS. 2-8, as will be described. The systems and methods of the invention can be used, for example, to completely eliminate the resolver as a position sensor for electric engine start and active rectification commutation to improve system reliability, complexity, and cost without necessarily reducing power density.

FIG. 1 is a sensor PM electrical machine diagram showing a sense winding or excitation coil wired around two or more rotor poles. The excitation coil is a secondary winding of a single phase high frequency rotating transformer (HFRT). The excitation coil is terminated by a series RC circuit for damping purposes and reducing losses in the excitation coil due to higher harmonic magnetic field in the air gap produced by the stator winding.

Figure 3:
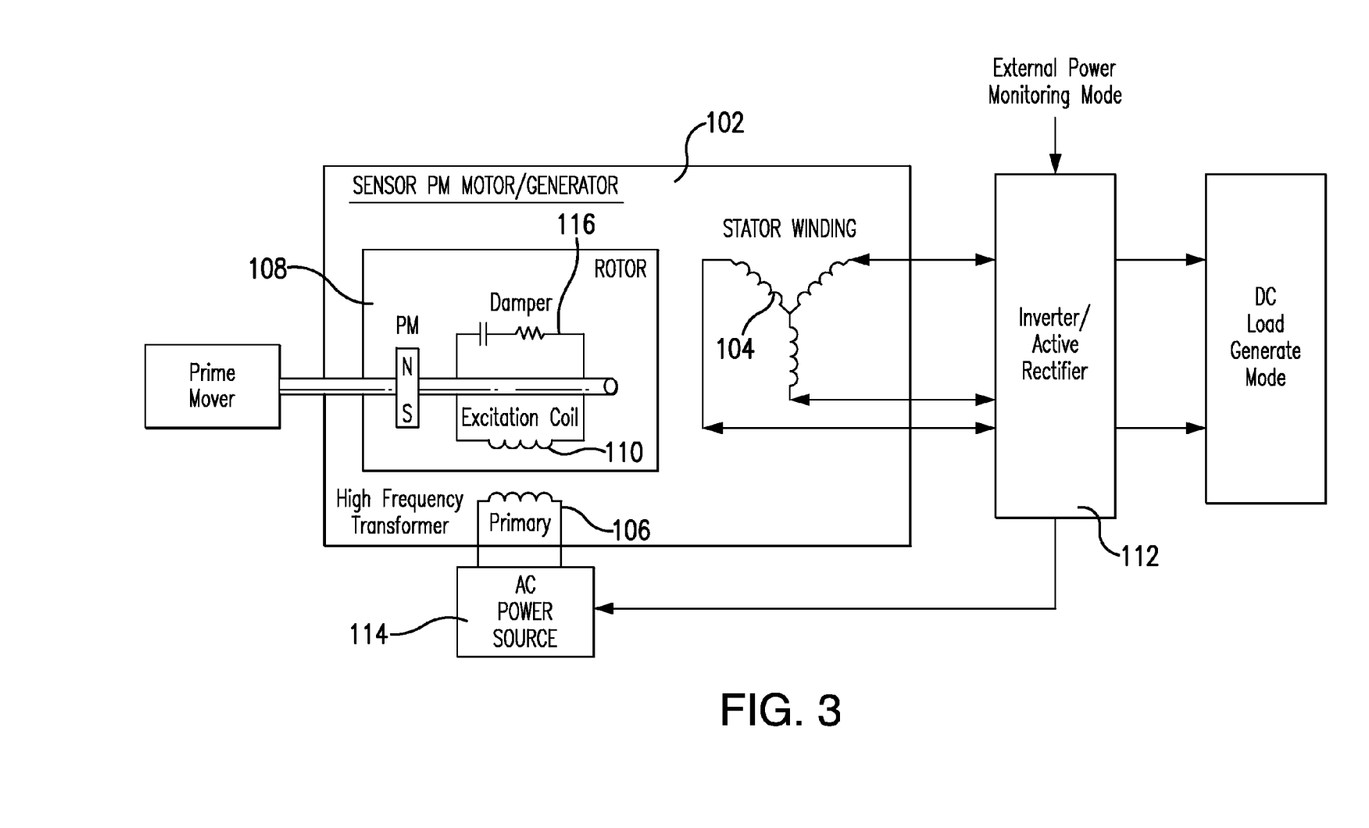
FIG. 3 is a block diagram of an exemplary embodiment of a system for controlling the electrical machine of FIG. 1 for in a motoring mode and a generate mode, schematically showing the rotor, stator winding, and an excitation coil as well as the inverter/active rectifier component.

Electrical machine 100 is a sensor PM electrical machine in that uses a sensor in addition to permanent magnets to provide feedback for motor control. Electrical machine 100 includes a stator 102 including a stator winding 104 and a primary transformer coil 106, which is shown in FIG. 3. A rotor 108 is operatively connected to rotate relative to stator 102. Rotor 108 includes a plurality of embedded permanent magnets indicated schematically in FIG. 2. The exemplary configuration in FIG. 2 has a four-pole rotor construction with two excitation coils 110. An excitation coil 110 is wound on rotor 108 and is operatively connected to form a rotating transformer with primary transformer coil 106.

With reference now to FIG. 3, an inverter/active rectifier component 112 is operatively connected to stator winding 104 and primary transformer coil 106 to control stator winding 104 based on excitation in stator winding 104 from both excitation coil 110 and from the permanent magnets of rotor 108. Inverter/active rectifier component 112 is connected to direct external power through stator 102 to drive rotor 108 in a motoring mode and to deliver power from stator 102 to an external DC load in a generate mode.

An AC power source 114 is operatively connected between inverter/active rectifier component 112 and primary transformer coil 106 to control power to the rotating transformer or HFRT. The HFRT can be designed to operate from 1.0-40 kHz, or any other suitable frequency range subject to transformer size and EMI filter design considerations. An RC damper 116 is connected in parallel with the excitation coil. AC power source controls the excitation frequency in excitation coil 110.

Figure 4:
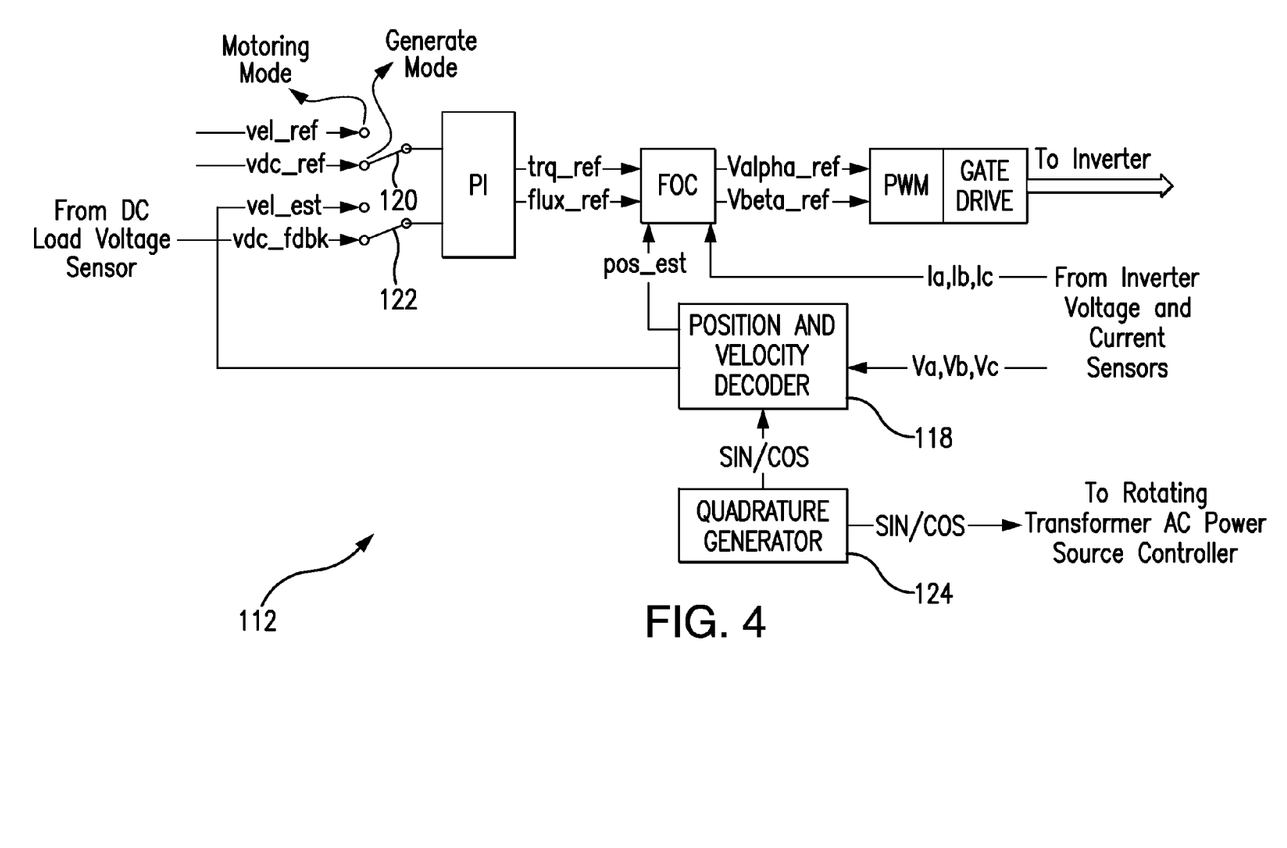
FIG. 4 is a block diagram of an exemplary embodiment of the inverter/active rectifier component of FIG. 3, showing the inputs and outputs for use determining rotor position and velocity for the motoring and generate modes, and also showing the position and velocity decoder.

Referring now to FIG. 4, inverter/active rectifier component 112 includes a position and velocity decoder 118 connected to receive inverter voltage signals $V_a$, $V_b$, and $V_c$ and to output position and velocity feedback, designated pos_est and vel_est in FIG. 4, respectively. A proportional and integral regulator, designated PI in FIG. 4, is included with a first switch 120 for switching between a velocity reference input for the motoring mode and a DC voltage reference for a generate mode. The PI also has a second switch 122 for switching between the velocity feedback and a DC voltage feedback input. The PI is configured to output a torque reference signal, designated trq_ref in FIG. 4, in the motoring mode and a flux reference signal, flux_ref in FIG. 4, in the generate mode. A field oriented control (FOC) is operatively connected to receive the reference signals from the PI, the position feedback from position and velocity decoder 118, and inverter current signals $I_a$, $I_b$, and $I_c$ and to output stationary frame command signals Valpha_ref and Vbeta_ref. Quadrature generator 124 is connected to an AC power source to inject quadrature signal (sine and cosine) into the excitation coil. The PWM converter shown in FIG. 4 operates as an engine start inverter during motoring mode and as an active rectifier during the generate mode.

Electrical machine 100 with the AC signal injected in the excitation coil 110 operates as a synchro at the injected frequency. The 3-wire synchro output can be easily converted into the resolver-equivalent format using Clark's 3-phase to 2-phase transformation (ABC to αβ stationary reference frames). The AC signal that contains rotor position information can be selected using synchronous filters which are synchronized with the quadrature generator that is used to inject ac signal into field winding. FIG. 4 is a high level block diagram of an electric engine start controller, which includes a speed control function using a field-oriented controller (FOC) to control motor torque in response to the estimated rotor position.

Figure 5:
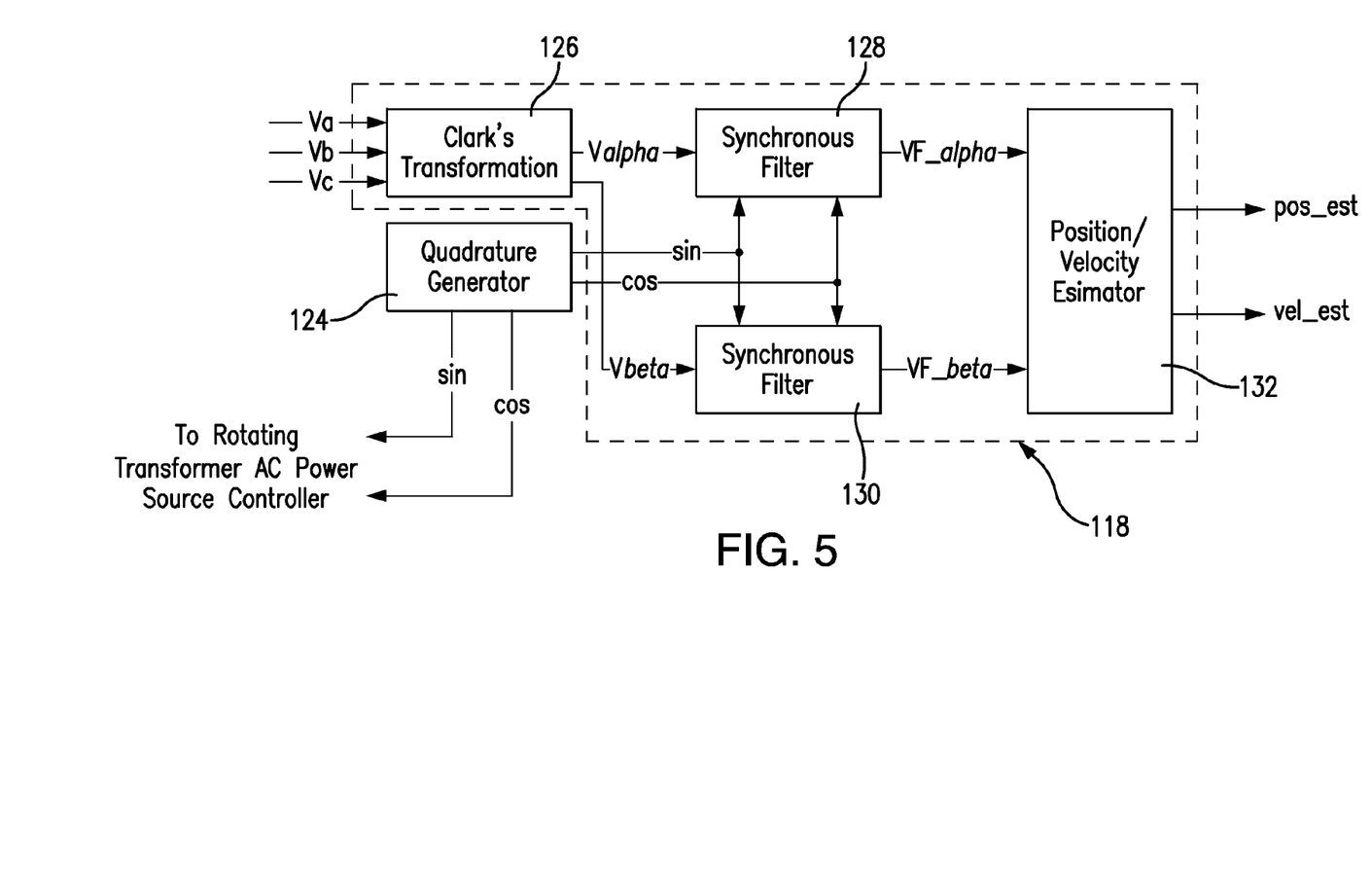
FIG. 5 is a block diagram of an exemplary embodiment of the position and velocity decoder of FIG. 4, showing the synchronous filters and the position and velocity estimator.

Referring now to FIG. 5, position and velocity decoder 118 includes a Clark's Transformation component 126 operatively connected to convert the three phase inverter voltage signals $V_a$, $V_b$, and $V_c$ into two phase voltage signals Valpha and Vbeta. A pair of synchronous filters 128 and 130 are connected each to receive a respective one of the two phase voltage signals Valpha and Vbeta. Each of the synchronous filters 128 and 130 is also connected to receive sine and cosine signals from quadrature generator 124 and to output respective VF_alpha and VF_beta signals phase-shifted by 90 electrical degrees that contain rotor position information to position velocity estimator 132. Position velocity estimator 132 in turn outputs the position and velocity feedback, labeled pos_est and vel_est in FIG. 5, which are also shown in FIG. 4.

FIG. 5 illustrates an embodiment using resolver-based signal processing to estimate rotor position from zero to high generator speed. Another embodiment that utilizes a zero/low speed position estimator and high speed position estimator based extended rotor flux is shown in FIG. 6.

Figure 6:
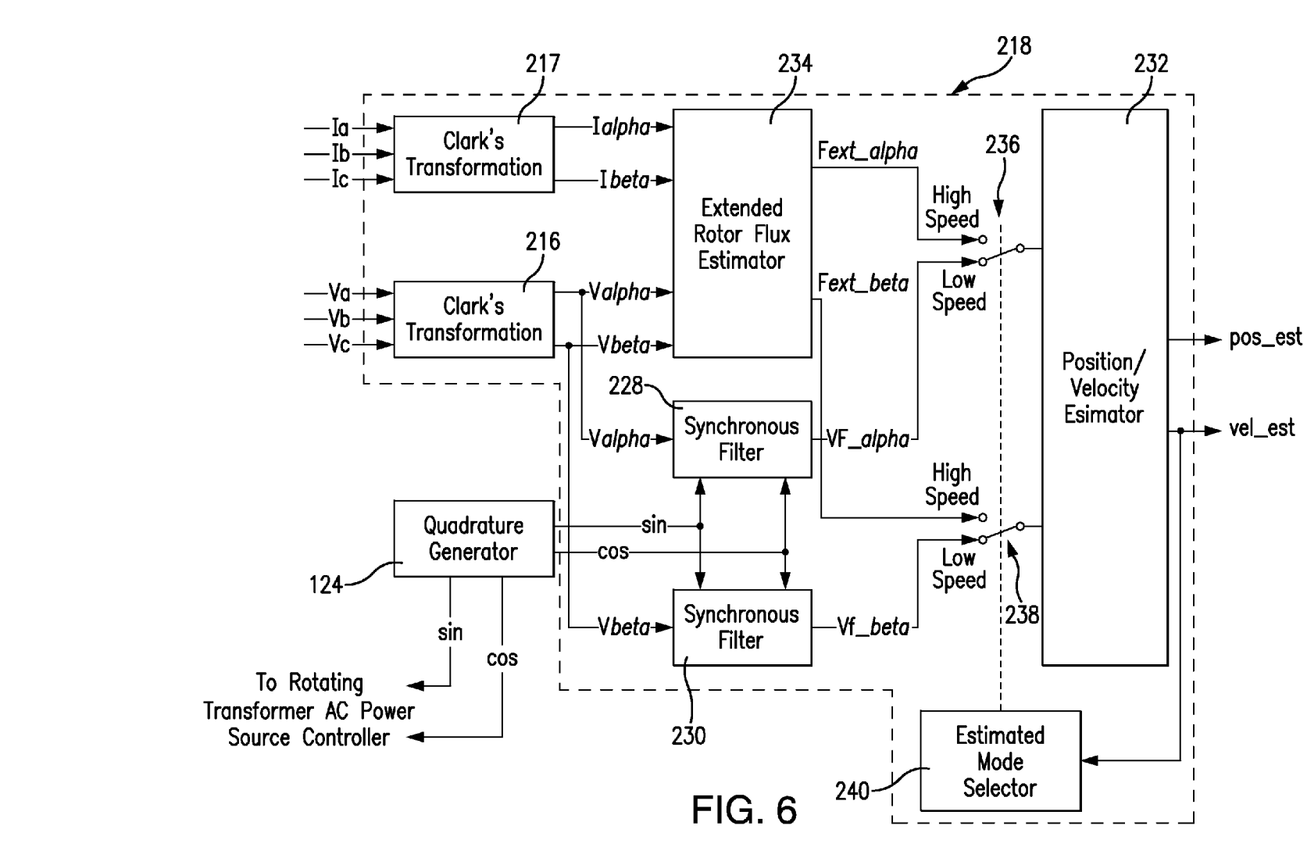
FIG. 6 is a block diagram of another exemplary embodiment of a position and velocity decoder of FIG. 4, showing an extended rotor flux estimator.

Making reference now to FIG. 6, a second embodiment of a position and velocity decoder 218 is shown, which can be used in inverter/active rectifier component 112 of FIG. 4 in lieu of position and velocity decoder 118. Position and velocity decoder 218 includes a Clark's Transformation component 216 and synchronous filters 228 and 230 connected as described above with respect to FIG. 5. In addition, position and velocity decoder 218 includes a second Clark's Transformation component 217 connected to convert the three phase/inverter current signals $I_a$, $I_b$, and $I_c$, into two phase current signals Ialpha and theta. An extended rotor flux estimator 234 is connected to receive the two phase current signals Ialpha and theta and the two phase voltage signals Valpha and Vbeta and to output Fext_alpha and Fext_beta signals phase-shifted by 90 electrical degrees that contain extended rotor flux information.

A position velocity estimator 232 is included with a first switch 236 for switching between Fext_alpha input in a high speed mode and VF_alpha input in a low speed mode and a second switch 238 for switching between Fext_beta input in a high speed mode and VF_beta in a low speed mode. Position/velocity estimator 232 is configured to output the position feedback and the velocity feedback as described above. An estimated mode selector 240 is connected to receive the velocity feedback, labeled vel_est in FIG. 6, and control the switches 236 and 238 of position/velocity estimator 232 for selection between the high and low speed modes. In the low speed mode, position and velocity decoder 218 operates the same as position and velocity decoder 118 of FIG. 5. In the high speed mode, position and velocity decoder 218 can switch to operate based on extended rotor flux.

Figure 7:
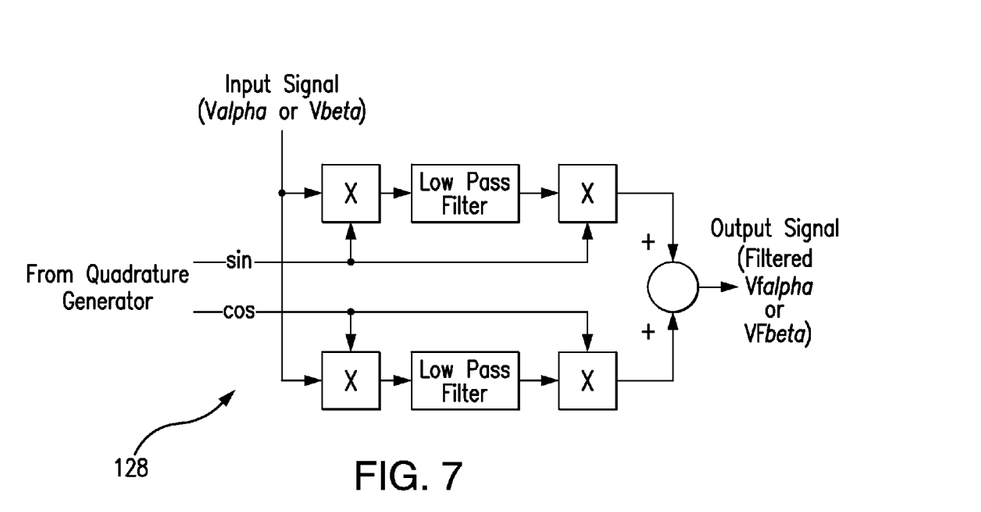
FIG. 7 is a block diagram of an exemplary embodiment of one of the synchronous filters shown in FIGS. 5 and 6.
Figure 8:
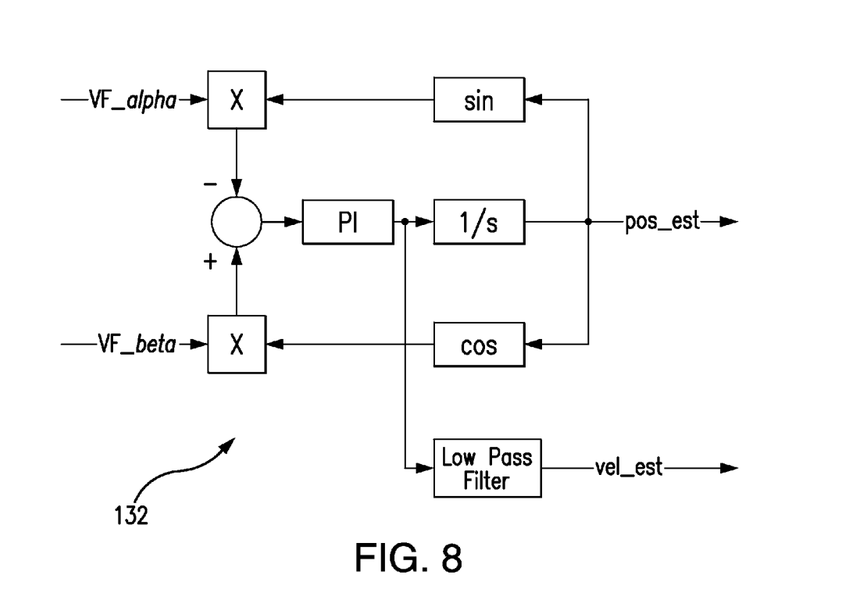
FIG. 8 is a block diagram of an exemplary embodiment of a position and velocity estimator shown in FIG. 5.

Details of a synchronous filter implementation and resolver-based signal processing for position and velocity estimation are shown in FIG. 7 and FIG. 8. Additional details can be found in U.S. Pat. No. 7,072,790 which is incorporated by reference above. Referring to FIG. 7, a block diagram of a synchronous filter 128 is shown. Synchronous filters 128, 130, 228, and 230 can all be of the same configuration as that shown in FIG. 7. Synchronous filters select voltage components Valpha and Vbeta that contain rotor position information and are synchronized with the signals from the quadrature generator. With reference to FIG. 8, a block diagram of the position/velocity estimator 132 of FIG. 5 is shown. The same phase-locked loop configuration can be used for the position velocity/estimator 232 of FIG. 6, the difference being that position velocity/estimator 232 connects to its inputs through switches 236 and 238.

An exemplary method of controlling an electrical machine, e.g., electrical machine 100, includes separating an excitation coil signal and a permanent magnet signal from a combined feedback signal from the electrical machine. The combined feedback signal can be picked up from the stator coils, and includes the signal from the permanent magnets passing the stator coil as well as the signal from the excitation coil, e.g., excitation coil 110. The position and velocity of the rotor can be estimated by separating the excitation coil signal and the permanent magnet signal and using estimated position and velocity of the rotor to control the electrical machine using an inverter/active rectifier component, e.g., inverter/active rectifier component 112 described above in FIGS. 3-8. Using estimated position and velocity of the rotor to control the electrical machine can include controlling rotor toque in a motoring mode and controlling rotor flux in a generate mode.

The methods and systems described herein offer potential benefits including improved system performance and reliability when operating as an active rectifier due to improved position sensing accuracy. Additional potential benefits include improved system complexity and cost, potential damping of rotor oscillations at variable load and improved stability, improved power density when a smaller size machine is used for electric pumps or actuators, and potential reduction in size of power semiconductors when used as electric engine start due to improved accuracy in rotor position sensing.

The methods and systems of the present invention, as described above and shown in the drawings, provide for electrical machine systems and methods with superior properties including, for example, improved system reliability, complexity, and cost without necessarily reducing power density. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. An electrical machine comprising:
    a stator including a stator winding and a primary transformer coil;
    a rotor operatively connected to rotate relative to the stator, wherein the rotor includes a plurality of embedded permanent magnets;
    an excitation coil wound on the rotor and operatively connected to form a rotating transformer with the primary transformer coil; and
    an inverter/active rectifier component operatively connected to the stator winding and the primary transformer coil to control the stator winding based on excitation in the stator winding from the excitation coil and permanent magnets.

2. An electrical machine as recited in claim 1, further comprising an AC power source operatively connected between the inverter/active rectifier component and the primary transformer coil to control power to the rotating transformer.

3. An electrical machine as recited in claim 1, further comprising an RC damper connected in parallel with the excitation coil.

4. An electrical machine as recited in claim 1, wherein the inverter/active rectifier component is configured to direct external power through the stator to drive the rotor in a motoring mode and to deliver power from the stator to an external DC load in a generate mode.

5. An electrical machine as recited in claim 4, wherein the inverter/active rectifier component includes:
   a position and velocity decoder configured and adapted to receive inverter voltage signals and to output position and velocity feedback;
   a proportional and integral regulator with a first switch for switching between a velocity reference input for the motoring mode and a DC voltage reference for a generate mode, and a second switch for switching between the velocity feedback and a DC voltage feedback input, wherein the proportional and integral regulator is configured to output a torque reference signal in the motoring mode and a flux reference signal in the generate mode; and
   a field oriented control operatively connected to receive the reference signals from the proportional and integral regulator, the position feedback from the position and velocity decoder, and inverter current signals and to output stationary frame command signals.

6. An electrical machine as recited in claim 5, further comprising a quadrature generator operatively connected to an AC power source to inject sine and cosine quadrature signals into the excitation coil.

7. An electrical machine as recited in claim 5, wherein the position and velocity decoder includes a Clark's Transformation component operatively connected to convert three phase inverter voltage signals into two phase voltage signals, with a pair of synchronous filters each operatively connected to receive a respective one of the two phase voltage signals, each synchronous filter being operatively connected to receive sine and cosine signals from a quadrature generator and to output VF_alpha and VF_beta signals phase-shifted by 90 electrical degrees that include rotor position information.

8. An electrical machine as recited in claim 7, further comprising a position/velocity estimator operatively connected to receive VF_alpha and VF_beta signals from the synchronous filters and to output the position feedback and the velocity feedback.

9. An electrical machine as recited in claim 7, further comprising:
   a second Clark's Transformation component operatively connected to convert three phase inverter current signals into two phase current signals; and
   an extended rotor flux estimator operatively connected to receive the two phase current signals and the two phase voltage signals and to output Fext_alpha and Fext_beta signals phase-shifted by 90 electrical degrees that include extended rotor flux information.

10. An electrical machine as recited in claim 9, further comprising a position velocity estimator with a first switch for switching between Fext_alpha input in a high speed mode and VF_alpha input in a low speed mode and a second switch for switching between Fext_beta input in a high speed mode and VF_beta in a low speed mode, wherein the position velocity estimator is configured to output the position feedback and the velocity feedback.

11. An electrical machine as recited in claim 10, further comprising an estimated mode selector operatively connected to receive the velocity feedback and control the first and second switches of the position velocity estimator for selection between the high and low speed modes.

12. A method of controlling an electrical machine comprising:
   separating an excitation coil signal and a permanent magnet signal from a combined feedback signal from an electrical machine as recited in claim 1;
   estimating position and velocity of the rotor based on the excitation coil signal and the permanent magnet signal; and
   using estimated position and velocity of the rotor to control the electrical machine.

13. A method as recited in claim 12, wherein using estimated position and velocity of the rotor to control the electrical machine includes controlling rotor toque in a motoring mode and controlling rotor flux in a generate mode.

14. An inverter/active rectifier component for directing external power through an electrical machine stator to drive a rotor in a motoring mode and to deliver power from the stator to an external DC load in a generate mode, the inverter/active rectifier component comprising:
   a position and velocity decoder configured and adapted to receive inverter voltage signals and to output position and velocity feedback;
   a proportional and integral regulator with a first switch for switching between a velocity reference input for the motoring mode and a DC voltage reference for a generate mode, and a second switch for switching between the velocity feedback and a DC voltage feedback input, wherein the proportional and integral regulator is configured to output a torque reference signal in the motoring mode and a flux reference signal in the generate mode; and
   a field oriented control operatively connected to receive the reference signals from the proportional and integral regulator, the position feedback from the position and velocity decoder, and inverter current signals and to output stationary frame command signals.

15. An inverter/active rectifier component as recited in claim 14, further comprising a quadrature generator operatively connected to an AC power source to inject sine and cosine quadrature signals into an excitation coil.

16. An inverter/active rectifier component as recited in claim 14, wherein the position and velocity decoder includes a Clark's Transformation component operatively connected to convert three phase inverter voltage signals into two phase voltage signals, with a pair of synchronous filters each operatively connected to receive a respective one of the two phase voltage signals, each synchronous filter being operatively connected to receive sine and cosine signals from a quadrature generator and to output VF_alpha and VF_beta signals phase-shifted by 90 electrical degrees that include rotor position information.

17. An inverter/active rectifier component as recited in claim 16, further comprising a position velocity estimator operatively connected to receive VF_alpha and VF_beta signals from the synchronous filters and to output the position feedback and the velocity feedback.

18. An inverter/active rectifier component as recited in claim 16, further comprising:
   a second Clark's Transformation component operatively connected to convert three phase inverter current signals into two phase current signals; and
   an extended rotor flux estimator operatively connected to receive the two phase current signals and the two phase voltage signals and to output Fext_alpha and Fext_beta signals phase-shifted by 90 electrical degrees that include extended rotor flux information.

19. An inverter/active rectifier as recited in claim 18, further comprising a position velocity estimator with a first switch for switching between Fext_alpha input in a high speed mode and VF_alpha input in a low speed mode and a second switch for switching between Fext_beta input in a high speed mode and VF_beta in a low speed mode, wherein the position/velocity estimator is configured to output the position feedback and the velocity feedback.

20. An inverter/active rectifier as recited in claim 19, further comprising an estimated mode selector operatively connected to receive the velocity feedback and control the first and second switches of the position velocity/estimator for selection between the high and low speed modes.

* * * * *